(No Model.)
E. J. MASON.
SECONDARY BATTERY.
No. 439,324. Patented Oct. 28, 1890.
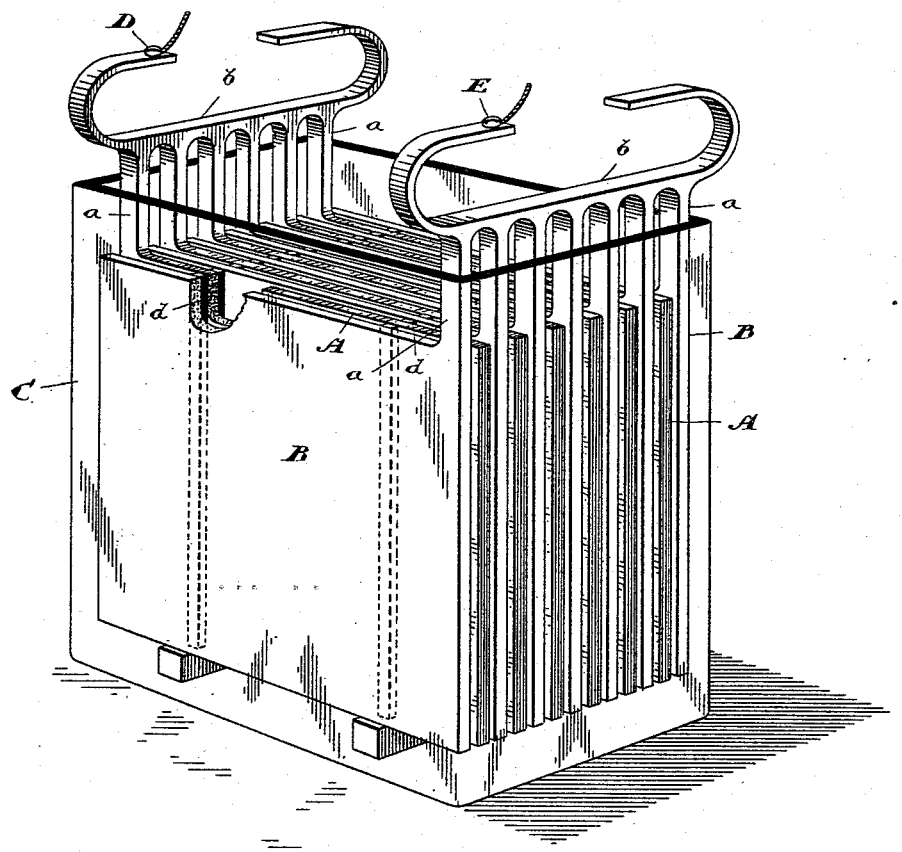
Witnesses
J. Edw. Maybee
F. R. Cameron
Inventor
Edward J. Mason
by Donald C. Ridout
Atty

UNITED STATES PATENT OFFICE.

EDWARD J. MASON, OF WATERFORD, CANADA, ASSIGNOR OF THREE-FOURTHS TO FRANK BROWN ALLAN, ELIAS EDWY SLAGHT, AND JOHN WILLIAM THOMPSON, ALL OF SAME PLACE.

SECONDARY BATTERY.

SPECIFICATION forming part of Letters Patent No. 439,324, dated October 28, 1890.

Application filed February 20, 1890. Serial No. 341,188. (No model.)

*To all whom it may concern:*

Be it known that I, EDWARD JAMES MASON, electrician, of the village of Waterford, in the county of Norfolk, in the Province of Ontario, Canada, have invented a certain new and Improved Electric Battery, of which the following is a specification.

The object of the invention is to secure an electric battery of minimum weight and capable of being used either as a primary or secondary battery and which will produce a powerful electric current at a minimum expense; and it consists, essentially, of one or more plates of peroxide of lead or other substance which will produce peroxide of lead under the action of an electric current, the said peroxide-of-lead plate or plates being placed between plates of sheet-iron coated with copper.

The figure is a perspective view of my improved battery.

In practice I have found that the best results are obtained by using plates of pure lead, peroxidized, placed between plates of pure copper as the soluble electrode; but in order to prevent the copper being disintegrated by the process of charging and discharging I prefer to have the copper supported on a core of iron.

In the drawing, the peroxidized plates are marked A and the copper plates are marked B. The lugs $a$ of both plates are connected by a metallic strip $b$, or they may be bolted together. The plates A and B are separated from one another by any suitable insulating material, such as rubber sticks $d$. Two rubber sticks $d$ are generally employed on each side of the plates A. The elements specified are placed within a suitable box C, made of glass, rubber, copper, or other suitable material which will not be acted upon by sulphuric acid at ordinary temperature—such as less than 120° Fahrenheit—a solution of sulphate of copper in water or a solution of sulphate of copper in sulphuric acid being placed in the box to surround the plates A and B. We find that the sulphate of copper and sulphuric acid gives the best results, and its specific gravity should be about 1.200. The positive terminal D of the charging-line is connected to the peroxide plate A, and the negative terminal E is connected to the copper plates B.

The chemical action will be as follows: The disengaged hydrogen reacts upon the sulphate of copper, liberating copper, which is deposited upon the plates connected with the negative terminal of the charging-line. The oxygen set free at the positive electrodes acts upon any sulphate of lead or oxide of lead, producing peroxide of lead. When the cell is disconnected from the charging-circuit and the copper electrodes are connected with the peroxide-of-lead electrodes by an electrical conductor, the copper which has been deposited upon the negative electrode in charging is acted upon by the sulphuric acid, forming sulphate of copper, which is dissolved by the solution, and the positive plate is reduced to sulphate of lead. It is this chemical action which causes the flow of electricity known as the "discharge of the cell."

The specific gravity of the solution in the battery remains almost constant during charging and discharging, thus giving the greatest possible efficiency.

What I claim as my invention is—

A battery comprising a soluble electrode composed of a series of iron plates coated with copper, a depolarizing electrode composed of a series of plates containing peroxide of lead, and an electrolyte of sulphate of copper in a solution containing free sulphuric acid.

Waterford, January 24, 1890.

EDWARD J. MASON.

In presence of—
EDWARD MATTHEWS,
EDWARD GRACE.